United States Patent
Wang et al.

(10) Patent No.: US 11,086,794 B2
(45) Date of Patent: Aug. 10, 2021

(54) MANAGING EVICTION FROM A DEDUPLICATION CACHE

(71) Applicant: EMC IP Holding Company LLC, Hopkinton, MA (US)

(72) Inventors: Yubing Wang, Southborough, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/398,689

(22) Filed: Apr. 30, 2019

(65) Prior Publication Data
US 2020/0349088 A1    Nov. 5, 2020

(51) Int. Cl.
*G06F 3/06* (2006.01)
*G06F 12/123* (2016.01)

(52) U.S. Cl.
CPC .......... *G06F 12/124* (2013.01); *G06F 3/0608* (2013.01); *G06F 3/0641* (2013.01); *G06F 3/0673* (2013.01); *G06F 3/067* (2013.01); *G06F 2212/1044* (2013.01); *G06F 2212/608* (2013.01)

(58) Field of Classification Search
None
See application file for complete search history.

(56) References Cited

U.S. PATENT DOCUMENTS

| | | | |
|---|---|---|---|
| 8,112,585 B2 | 2/2012 | Patel et al. | |
| 8,607,001 B2 | 12/2013 | Zhao et al. | |
| 8,924,647 B1 | 12/2014 | Evans | |
| 9,047,225 B1 | 6/2015 | Evans | |
| 9,933,971 B2 * | 4/2018 | Kenkre | G06F 3/065 |
| 2011/0191305 A1 * | 8/2011 | Nakamura | G06F 3/0641 707/692 |
| 2018/0225300 A1 * | 8/2018 | Harnik | G06F 16/1752 |

OTHER PUBLICATIONS

Faibish, Sorin, et al.; "Elastically Managing Cache for Sub-Block Deduplication," U.S. Appl. No. 16/176,703, filed Oct. 31, 2018.
Rummery et al., "On-Line Q-Learning Using Connectionist Systems," Cambridge University Engineering Department, England, Sep. 1994, 21 pages.
Sutton & Barto, "Reinforcement Learning: An Introduction," The MIT Press, Cambridge, MA, downloaded from http://webdocs.cs.ualberta.ca/~sutton/book/ebook/the-book.html, particularly section 7.5 "Sarsa," viewed at http"//webdocs.cs.ualberta.ca/!sutton/book/ebook/node77.html, downloaded on Oct. 1, 2012.
Ari et al., ACME: Adaptive Caching Using Multiple Experts, Workshop on Distributed Data & Structures, 2002, pp. 143-158.
Aguilar et al., A Cache Memory System based on Dynamic/Adaptive Replacement Approach, Technical Report, University of Houston, Department of Science, 2003.

* cited by examiner

*Primary Examiner* — Brian R Peugh
(74) *Attorney, Agent, or Firm* — BainwoodHuang

(57) ABSTRACT

A technique for managing a deduplication digest cache (DDC) includes assigning each digest entry of the DDC to one of multiple entry lists, scoring the entry lists based at least in part on the deduplicability of the data represented by the digest entries in the entry lists, and selecting for eviction from the DDC entries assigned to the lowest-scoring entry list. In this manner, entries assigned to entry lists that perform more poorly in terms of deduplicability tend to be evicted more quickly than entries assigned to entry lists that perform better.

18 Claims, 4 Drawing Sheets

MANAGING EVICTION FROM A DEDUPLICATION CACHE

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Some data storage systems support data deduplication, which provides a mechanism for reducing the number of different copies of the same data. For example, a storage system maintains a digest database that associates hash values computed from data blocks with corresponding locations where those data blocks can be found in the system. The hash values typically have enough entropy to uniquely identify each data block, even though they are normally much smaller than the data blocks themselves. In a background process and/or inline with write requests, the storage system computes a digest from a candidate block and performs a lookup for the computed digest in the digest database. If the storage system finds a match to a target block referenced by an entry in the database (i.e., one that has the same digest value), the storage system may effect storage of the candidate block by adjusting its metadata, such that requests for the candidate block are directed to the target block. In this manner, the storage system may retain only the target block and discard the candidate block, avoiding duplication.

SUMMARY

Some storage systems rely heavily on caching of digest databases for promoting efficient deduplication. A cache may be implemented in high-speed memory, which enables quick lookups for duplicates. Memory is a finite resource, however, and it is often necessary to limit a digest database to a certain, maximum size. In this context, it becomes essential to apply a policy aimed at retaining digest entries that are likely to produce cache hits in the future and evicting digest entries that are not. Unfortunately, existing approaches to managing deduplication caches can be inflexible and ineffective.

In contrast with prior approaches, an improved technique for managing a deduplication digest cache (DDC) includes assigning each digest entry of the DDC to one of multiple entry lists, scoring the entry lists based at least in part on the deduplicability of the data represented by the digest entries in the entry lists, and selecting for eviction from the DDC entries assigned to the lowest-scoring entry list. In this manner, entries assigned to entry lists that perform more poorly in terms of deduplicability tend to be evicted more quickly than entries assigned to entry lists that perform better.

In some examples, each entry list belongs to a deduplicability group, where different deduplicability groups represent different levels of deduplicability, such as bad, good, and excellent. In some examples, each data object for which a digest entry is created (e.g., LUN (Logical UNit), file system, virtual machine disk, etc.) also belongs to one of the deduplicability groups, e.g., based on its own level of deduplicability. In this manner, digest entries may be assigned to entry lists, and therefore to deduplicability groups, based on the deduplicability of the data objects for which they are created.

In some examples, scoring of entry lists is repeated over time, as the contents of the entry lists change. If a different entry list scores lowest on a later iteration, that entry list becomes the new target for eviction from the DDC. The improved technique is thus adaptable to changes in the deduplicability of data, switching the target of eviction from one entry list to another as circumstances change. According to some variants, scoring of entry lists is performed as part of a reinforcement learning system whose goal it is to maximize cache hits in the DDC.

Certain embodiments are directed to a method of managing a deduplication digest cache (DDC) in a computerized apparatus. The method includes assigning each of a plurality of entries in the DDC to one of multiple entry lists, each of the plurality of entries in the DDC representing respective data. The method further includes scoring the entry lists, based at least in part on a deduplicability of data whose entries are assigned to the entry lists, the scored entry lists including a lowest-scoring entry list, and evicting from the DDC a set of entries assigned to the lowest-scoring entry list.

Other embodiments are directed to a computerized apparatus constructed and arranged to perform a method of managing a deduplication digest cache, such as the method described above. Still other embodiments are directed to a computer program product. The computer program product stores instructions which, when executed on control circuitry of a computerized apparatus, cause the computerized apparatus to perform a method of managing a deduplication digest cache, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

A technique for managing a deduplication digest cache (DDC) includes assigning each digest entry of the DDC to one of multiple entry lists, scoring the entry lists based at least in part on the deduplicability of the data represented by the digest entries in the entry lists, and selecting for eviction from the DDC entries assigned to the lowest-scoring entry list.

Figure 1:
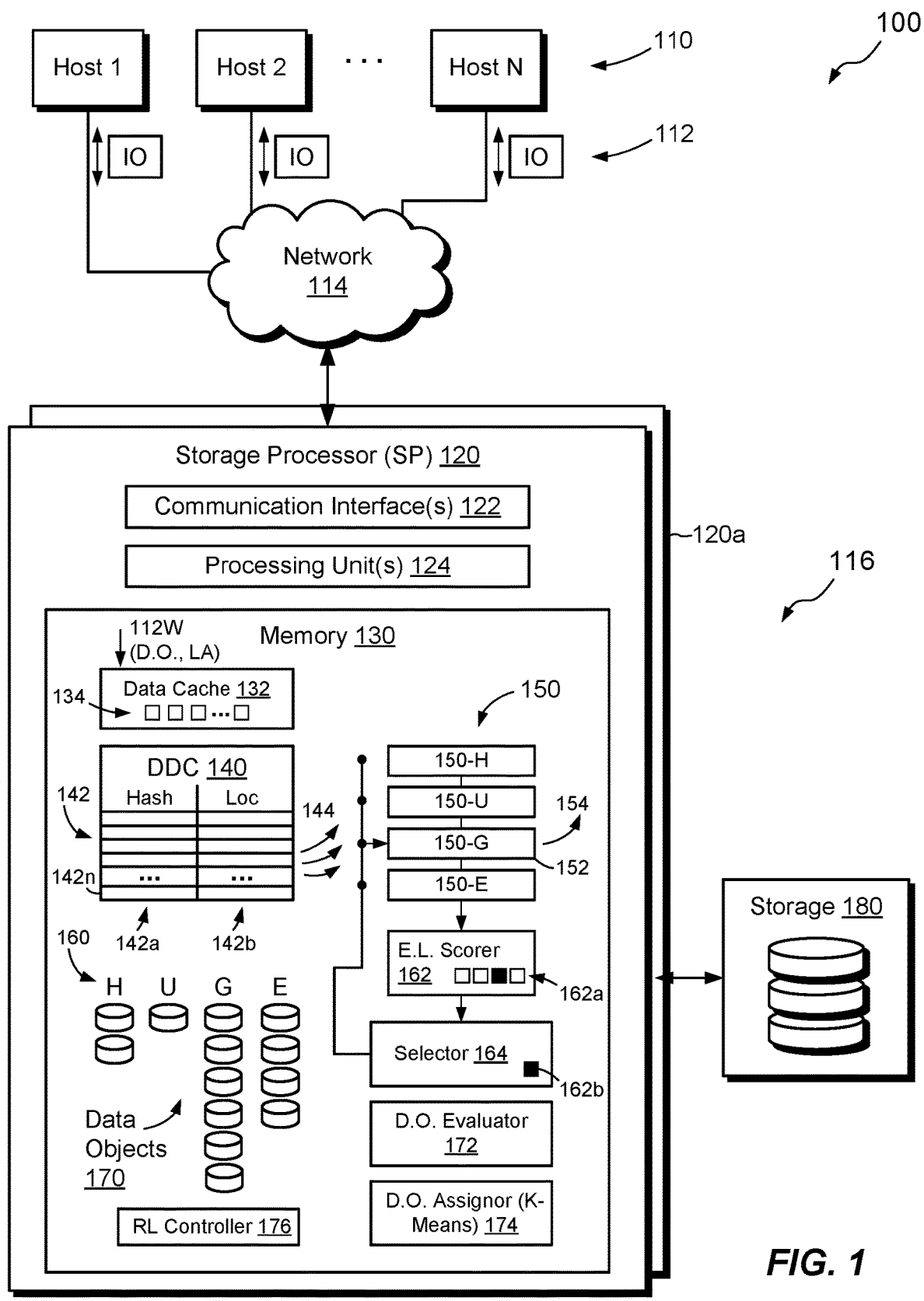
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 116 over a network 114. The data storage system 116 includes a storage processor, or "SP," 120 and storage 180, such as magnetic disk drives, electronic flash drives, and/or the like. The data storage system 116 may include multiple SPs (e.g., a second SP 120a). For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be present. No particular hardware configuration is required, however, as any number of SPs may be provided, including a single SP, in any arrangement, and the SP 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 180.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a data cache 132, a deduplication digest cache (DDC) 140, and multiple entry lists 150. In an example, the data cache 132 and DDC 140 are implemented in high-speed memory, such as DRAM (Dynamic Random Access Memory). Data cache 132 is configured to store blocks 134 of data, such as those received in I/O write requests 112W from hosts 110 and/or those read from storage 180. DDC 140 is configured to store multiple digest entries 142, where each entry 142 associates a digest (e.g., a hash value) 142a, calculated from a block 134, to a respective location indicator 142b that provides information for locating the block 134. For example, the location indicator 142b may be an address of a cached version of the block in data cache 132, an address of the block 134 in an underlying file system, or an address in cache or in the file system of a virtual block map (VBM) that maps the block 134. DDC 140 may be implemented as an array, as a key-value store where the digest value 142a provides the key, or in any other suitable manner.

Entry lists 150 contain references to digest entries 142 stored in the DDC 140. For example, multiple digest entries 142 in DDC 140 are assigned to entry lists 150 based on a policy. Each of the entry lists 150, i.e., 150-H, 150-U, 150-G, and 150-E, belong to deduplicability groups 160, which are arranged based on deduplicability level. For example, "If" indicates Hardly deduplicable, "U" indicates Unknown deduplicability, "G" indicates Good deduplicability, and "E" indicates Excellent deduplicability. Any number of deduplicability groups 160 may be provided.

As further shown, memory 130 includes data objects 170, such as LUNs (Logical UNits), file systems, virtual machine disks, and the like. Any number of data objects may be provided of any type, and such data objects may be backed by storage 180, or by storage located elsewhere. In a particular example, SP 120 internally represents data objects 170 as respective LUNs but expresses those LUNs to hosts 110 as any desired types of data objects, e.g., LUN, file system, virtual machine disk, and the like. In the depicted arrangement, LUNs provide a common structure for all data object types and thus form a convenient basis for classifying data objects based on deduplicability. No particular data-object arrangement is required, however.

As still further shown in FIG. 1, memory 130 also includes an entry list ("E.L.") scorer 162, a selector 164, a data object ("D.O.") evaluator 172, and a data object assigner 174. The E.L. scorer 162 is configured to generate a score 162a for each of the entry lists 150. In an example, each score 162a is based at least in part on the deduplicability of data that are referenced by the entries 142 assigned to the respective entry list 150.

Selector 164 is configured to receive the scores 162a for the entry lists 150 and to select the currently-lowest score 162b. One should appreciate that a variety of scoring conventions may be used, and that the lowest score need not always be the score with the lowest numerical value. For example, all scores could be negative by convention, in which case the lowest-scoring entry list could be the one with the maximum numerical value. Thus, the lowest score is the one that indicates the poorest-performing entry list 150 in terms of deduplicability, regardless of numerical value.

The selector 164 is further configured to select the currently lowest-scoring entry list 152 as a target for evicting entries from the DDC 140. For example, if the selector 164 selects entry list 150-G as the currently lowest-scoring entry list, then digest entries 142 listed in entry list 150-G would be current targets for eviction 154 from the DDC 140, e.g., as needed to limit the size of the DDC 140.

Data object evaluator 172 is configured to evaluate data objects 170 for their deduplicability levels. For example, data object evaluator 172 is configured to grade each data object 170 (e.g., each LUN) based on its deduplication rate and/or its DDC hit count. The "deduplication rate" of a data object may be defined as the ratio of the number of deduplicated blocks in the data object to the number of allocated blocks in that data object. Thus, deduplication rate provides a relative measure of "deduplicatedness" of the data object. "DDC hit count" in this context refers to the number of cache hits in the DDC 140 for blocks allocated for the respective data object. Thus, a high DDC hit count may indicate that the deduplication rate of a data object is rising. Some data objects 170 may be too new or too seldom-used to have clearly determinable deduplication levels.

Data object assignor 174 is configured to receive the deduplicability levels of data objects 170 as produced by the data object evaluator 172 and to assign the data objects 170 to groups 160 based on their deduplicability levels. For example, a highly deduplicable data object may be assigned to the "E" group (Excellent), whereas a poorly deduplicable data object may be assigned to the "H" group (Hardly). Data objects with somewhat high deduplicability may be assigned to the "G" group (Good), while data objects with no currently-determinable level of deduplicability may be assigned to the "U" group (Unknown). Data object assignor 174 may use a variety of methods for assigning data objects 170 to groups 160. For example, data object assignor 174 may generate a histogram of deduplicability levels of all data objects 170 (e.g., excluding those that have undetermined levels) and divide the histogram vertically into H, G, and E regions, thereafter assigning data objects to groups based on the region in which the data objects appear. Another example is to use K-means clustering that uses deduplicability level as a clustering parameter.

In example operation, hosts 110 issue I/O requests 112 to the data storage system 116. SP 120 receives the I/O requests 112 at the communication interfaces 122 and initiates further processing. Some of the I/O requests 112 specify writes 112W of data to specified locations (e.g., logical addresses) of specified data objects 170. SP 120 receives the specified data into blocks 134 of data cache 132. SP 120 may attempt to deduplicate the blocks 134, e.g., by hashing the blocks 134 to compute digests and performing lookups into the DDC 140 for the computed digests. A cache hit into the DDC 140 may result in successful deduplication of the respective block 134, whereas a cache miss may result in creation of a new entry 142n in the DDC 140, e.g., by recording the computed digest and a pointer to the block 134 in the fields 142a and 142b, respectively, of the new entry 142n.

In response to creation of the new digest entry 142n for a block 134 in the DDC 140, SP 120 assigns 144 the new digest entry 142n to one of the entry lists 150. For example, SP 120 identifies the data object 170 to which the block 134 belongs, e.g., the data object specified in the respective write request 112W, and looks up the deduplicability group 160 for that data object 170. For example, if the data object 170 for the new entry 142n falls within the H group, then SP 120 assigns the new entry 142n to the entry list 150-H. In an example, a separate table (not shown) may be provided for associating data objects 170 with respective deduplicability groups 160.

Operation may proceed in this fashion, with each new entry in the DDC 140 being assigned to a respective one of the entry lists 150 based on the deduplicability group 160 of the data object 170 for which that new entry was created. Eventually, if not from the beginning, most if not all digest entries 142 in the DDC 140 are assigned to entry lists 150, and each entry list 150 grows to an arbitrarily large size to accommodate its assigned entries 142.

On some repeating basis, such as once every minute, once every 30 seconds, or once every 10 seconds, for example, scorer 162 generates a new score 162a for each of the entry lists 150. In an example, scorer 162 applies the following factors in generating a new score 162a for each of the entry lists 150:

A number of digest entries 142 assigned to the entry list 150;

A number of deduplication hits in the DDC 140 for digest entries 142 in the entry list 150;

An average age in the DDC 140 of digest entries 142 in the entry list 150;

An average time between deduplication hits for digest entries 142 in the entry list 150;

A deduplication hit rate of digest entries 142 in the entry list 150.

A "deduplication hit" in this context refers to a cache hit in the DDC 140, which arises as a result of a digest lookup into the DDC 140 that produces a match. Each deduplication hit is generally followed by a successful deduplication of a block 134. "Average age" may be determined based on timestamps applied to digest entries 142 at their respective times of creation, e.g., by subtracting the times indicated by the timestamps from the current time. Also, "average time between deduplication hits" may be computed by monitoring the times of cache hits in the DDC 140 and associating those times with the entry lists 150 that were assigned to the entries that were hit.

The above factors may be used individually or in any combination, but are preferably all used together. In an example, scorer 162 calculates each score 162a as a weighted sum of the above factors. In some examples, the weighted sum is based not only on currently-determined factors but also on previously-determined factors for the same entry lists 150. For example, each score 160a may be based on a balance between new factors and old factors, with contributions from old factors diminishing exponentially over time. Scores 162a are thus not necessarily snapshots of current performance but rather may represent something akin to moving averages.

In an example, each time the scorer 162 produces a new batch of scores 162a, selector 164 selects the lowest score 162b and thus the lowest-scoring entry list 152. DDC 140 then proceeds to evict entries 142 that are assigned to that lowest-scoring entry list 152. In an example, eviction from the lowest-scoring entry list 152 is exclusive, meaning that only entries listed on the entry list 152 may be evicted from the DDC 140, while entries 142 on all other entry lists 150 remain in the DDC 140. In other examples, eviction from the lowest-scoring entry list 152 need not be exclusive. For example, entry lists 150 may be ranked based on scores 162a, with multiple entry lists 150 becoming targets for eviction. In such cases, however, eviction may still be biased in favor of the lowest-scoring entry list 152, with evictions proceeding at progressively lower rates for higher-scoring entry lists 150. Also, one should appreciate that selection of an entry list 150 as a target for eviction does not necessarily require that all entries 142 on that entry list be evicted. Rather, eviction may proceed only as minimally needed to maintain the DDC 140 at a specified maximum size. Thus, it may be expected that entries 142 may be evicted from the DDC 140 essentially one at a time, or a group at a time. But generally an entire entry lists 150 will not be evicted all at once.

As time passes, SP 120 receives new write requests 112W specifying new data, caches the new data in new blocks 134 of data cache 132, and creates new entries 142 for at least some of the new blocks 134. SP 120 also assigns 144 the new entries to entry lists 150. While this activity proceeds, the DDC 140 continues to evict entries from the currently lowest-scoring entry list 152, thereby keeping the size of the DDC 140 approximately constant. In an example, eviction from the currently lowest-scoring entry list 152 acts as a kind of negative feedback, as evicting entries from that list tends to reduce both the number of entries and the average age of entries on that list, thus tending to raise the score of that entry list in the future. As a result, it becomes likely that a different entry list 150 will be selected for eviction upon a later iteration.

Note that the score 162a of an entry list 150 is permitted to vary independently from the group to which the entry list belongs. Thus, for example, the lowest-scoring entry list 152 in the illustrated example is entry list 150-G. Although one might expect list 150-H to perform more poorly than list 150-G, given that it belongs to the Hardly deduplicable group rather than to the Good group, this is not necessarily the case. The Good group during the preceding sample interval performed worse, so it becomes the target for eviction. If this trend continues, one might consider reevaluating whether the Good group really is good.

In an example, such reevaluation is provided by the data object evaluator 172 and data object assignor 174, which repetitively evaluate each data object 170 for deduplicability level, e.g., based on the aforementioned deduplication rate, and reassign data objects to deduplicability groups 160 based on results. For example, a data object previously in the Good group may move to the Hardly deduplicable group if its deduplicability can no longer be considered good relative to other data objects. Given the way that histograms or K-means classifications operate, classifications into groups 160 are relative to members of other groups. Therefore, group memberships may change over time based on changes in a data object's own deduplicability and/or changes in deduplicability of other data objects. Reevaluation and reclassification of data objects 170 may be conducted at the same rate at which the scorer 162 operates to score entry lists 150, or it may be conducted at a different rate, such as once per day. Also, the rate may vary based on the sizes of the data objects 170 and the volumes of write or delete activities that they encounter.

In a particular example, operation of the scorer 162 and selector 164 may be orchestrated by a reinforcement learning (RL) controller 176. The RL controller 176 may be programmed with the goal of maximizing a long-term cache hit rate of the DDC 140. Although reinforcement learning provides an effective approach for managing eviction in the DDC 140, it should be emphasized that reinforcement learning is merely one of many ways for controlling operation of the DDC 140. For example, embodiments hereof may employ fuzzy logic, neural nets, combinatorial logic, other types of logic, programming loops, and/or informal or ad hoc approaches, provided that such approaches are able to manage iterative generation of scores 162a and selections of lowest-scoring entry lists 152 for eviction from the DDC 140. Should reinforcement learning be used, one suitable implementation is a K-Armed Bandit approach, which may be tuned for relatively greedy operation, such that maximizing current performance is given priority over maximizing later performance.

Figure 2:
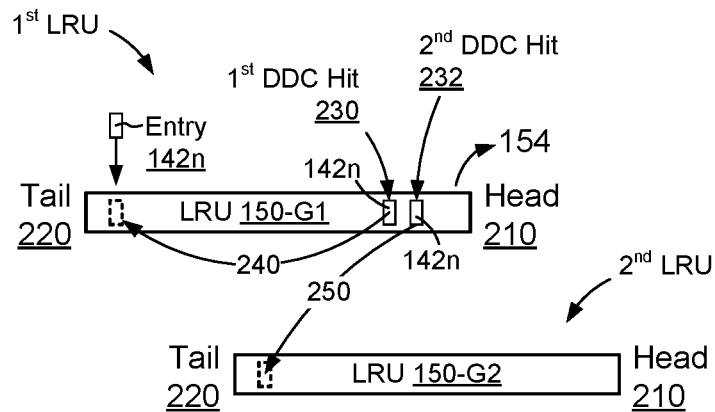
FIG. 2 is a block diagram of a pair of LRUs (Least Recently Used queues) that belong to a particular deduplicability group of FIG. 1.

FIG. 2 shows example entry lists 150 in additional detail. In this example, two separate entry lists 150-G1 and 150-G2 are shown and both entry lists belong to the same group 160. The point is thus illustrated that any number of entry lists 150 may be assigned to a deduplicability group, i.e., the number is not limited to one. Alternatively, the arrangement in FIG. 2 may be regarded as a single entry list 150-G that is provided in two components, 150-G1 and 150-G2. The entry list(s) shown in FIG. 2 are intended to be representative of entry lists 150 for all groups 160, although this is not required.

As shown, each entry list 150-G1 or 150-G2 has a head 210 and a tail 220 and may include any number of elements between the head 210 and the tail 220. Each element represents a respective entry 142 in the DDC 140 and may include a reference thereto. In an example, each of the entry lists 150-G1 or 150-G2 is configured as a respective LRU (Least Recently Used queue). New elements are added to the tail 220 of each queue and old elements are consumed (e.g., evicted) from the head 210.

Using two LRUs per group 160 enables the first LRU (e.g., 150-G1) to receive newly-created entries and for the second LRU (e.g., 150-G2) to receive popular entries from the first LRU. This separation has the effect of protecting popular entries from being prematurely evicted. Here, an entry is considered "popular" if it receives greater than a predetermined number of DDC hits. Popular entries are generally good candidates for future DDC hits. An example of the predetermined number is two, meaning that an entry 142 gets promoted from the first LRU to the second LRU if it receives two or more DDC hits. This is merely an example, however, and the predetermined number may be considered as a tunable parameter. If an entry has received at least one but fewer than the predetermined number of DDC hits, that entry may be moved back to the tail 220 of the first LRU.

FIG. 2 shows the above-described arrangement. Here, SP 120 adds a new entry 142n (e.g., from a newly created entry 142 in the DDC 140) to the tail 220 of LRU 150-G1. Over time, as additional new entries arrive, entry 142n shifts to the right (from the perspective shown), eventually getting close to the head 210, where the entry 142n becomes at risk of being evicted from the DDC 140. Before this happens, however, a first DDC hit 230 occurs, e.g., in response to a successful lookup in the DDC 140 to the block represented by the entry 142n. In response to the occurrence of this first DDC hit 230, SP 120 moves (arrow 240) the new entry 142n back to the tail 220 of LRU 150-G1. The first DDC hit 230 thus has the effect of sending the entry 142n to the back of the line, where it is less at risk for immediate eviction.

Over time, the entry 142n may again creep to the right. But now a second DDC hit 232 arrives, and the predetermined number of hits (two) is reached. SP 120 then moves the entry 142n (arrow 250) to the tail 220 of the second LRU, LRU 150-G2. Given that the entries in the second LRU 150-G2 are generally more deduplicable than those in the first LRU 150-G1 (e.g., by design), the risk of eviction from the second LRU is typically much less than the risk of eviction from the first LRU, even if the same standards are applied for evicting from both (e.g., scores 162a). It is nevertheless possible for SP 120 to evict from a second LRU (if it scores the lowest), and this may occur of the LRU becomes very long and/or contains very old entries. In some examples, different standards are applied for scoring the first and second LRUs of a group.

Figure 3:
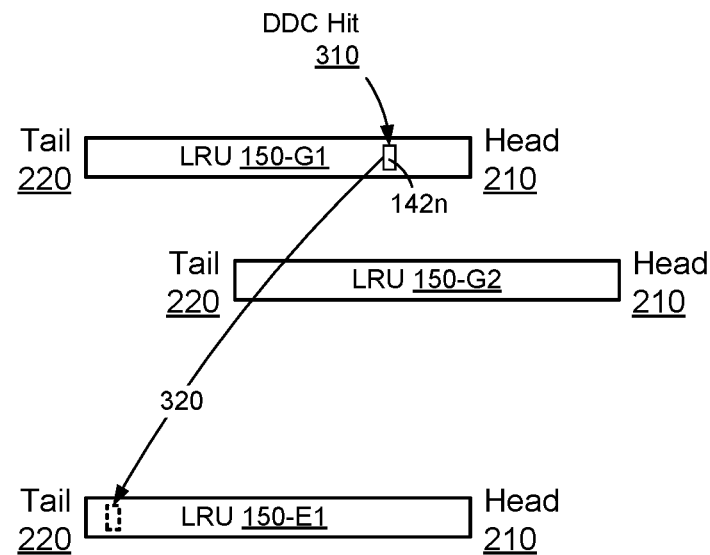
FIG. 3 is a block diagram shown movement of an entry between LRUs of two different deduplicability groups.

FIG. 3 shows an example arrangement in which the entry 142n is moved from an LRU in one group 160 to an LRU in another group 160. Such movement of an entry may occur, for example, in response to a change in the group 160 to which the data object 170 belongs (i.e., the data object to which the respective data was written). For example, assume that entry 142n was originally added to LRU 150-G1 when the block 134, from which entry 142n was created, belonged to a particular data object assigned to the Good group. Assume now that, during the time since entry 142n was added, the particular data object has performed much better and now belongs to the Excellent group. If the entry 142n now receives a DDC hit 310, then SP 120 checks the current group of the particular data object. Detecting that the particular data object is now counted as Excellent, SP 120 moves the entry 142n from the LRU of group G to one of the LRUs of group E. Here, entry 142n is moved to the tail 220 of LRU 150-E1, but it could also be moved to the tail 220 of LRU 150-E2. This may be especially the case if entry 162n had been placed in LRU 150-G2 (the second LRU) prior to the DDC hit 310, or if the DDC hit 310 caused the entry 162n to reach the predetermined number of hits needed for promotion to a second LRU. In some examples, entries 142 created during writes to a particular data object may be moved to a new group immediately upon detecting that the particular data object has changed group. Such movement is expected to be unnecessary, however, as entries will either receive DDC hits, in which case they will be moved, or they will not, in which case they will be evicted.

Figure 4:
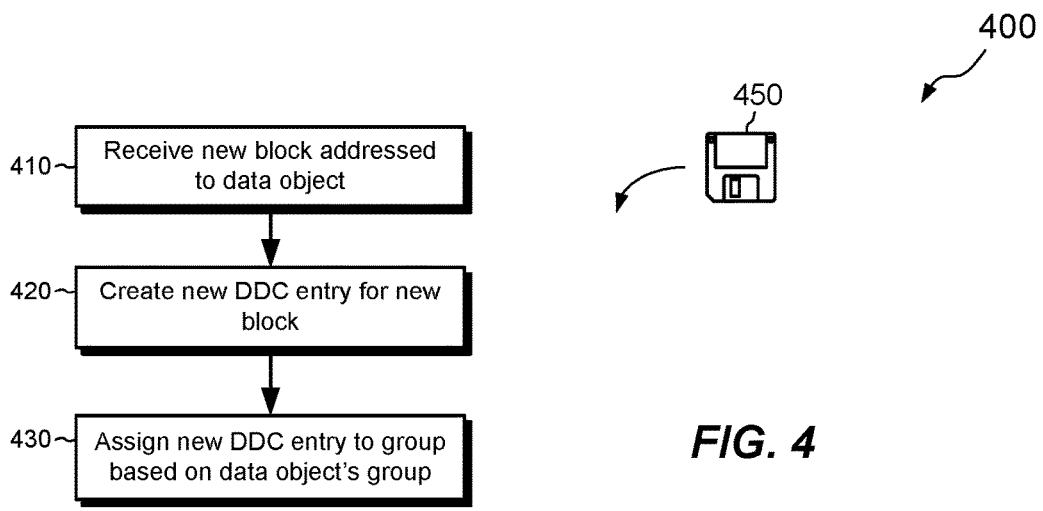
FIGS. 4-6 are flowcharts showing various methods for managing a deduplication cache.
Figure 5:
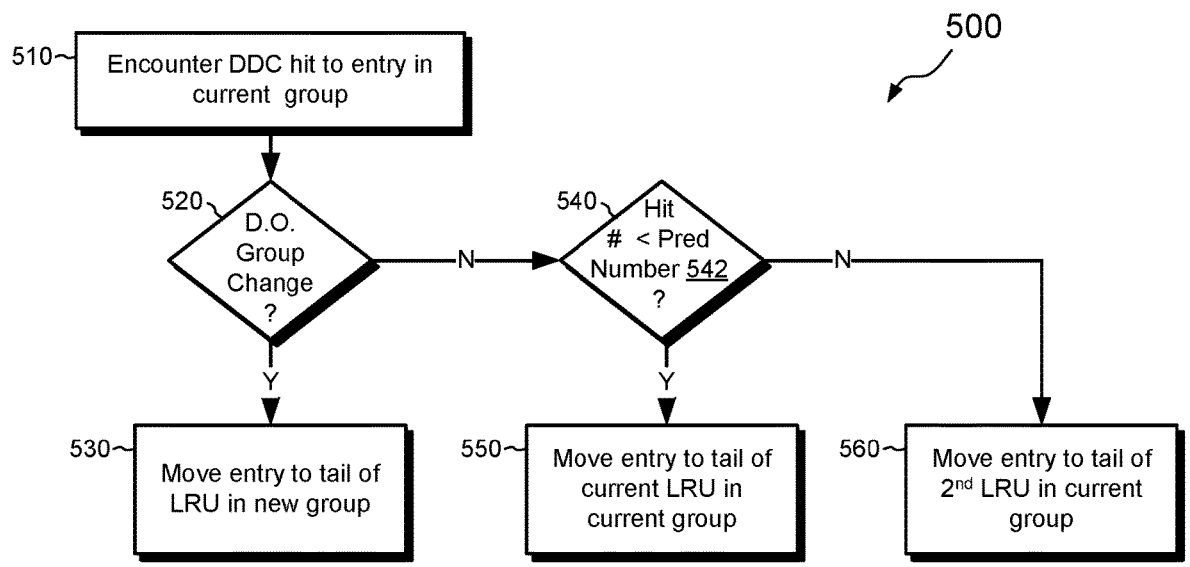
Figure 6:
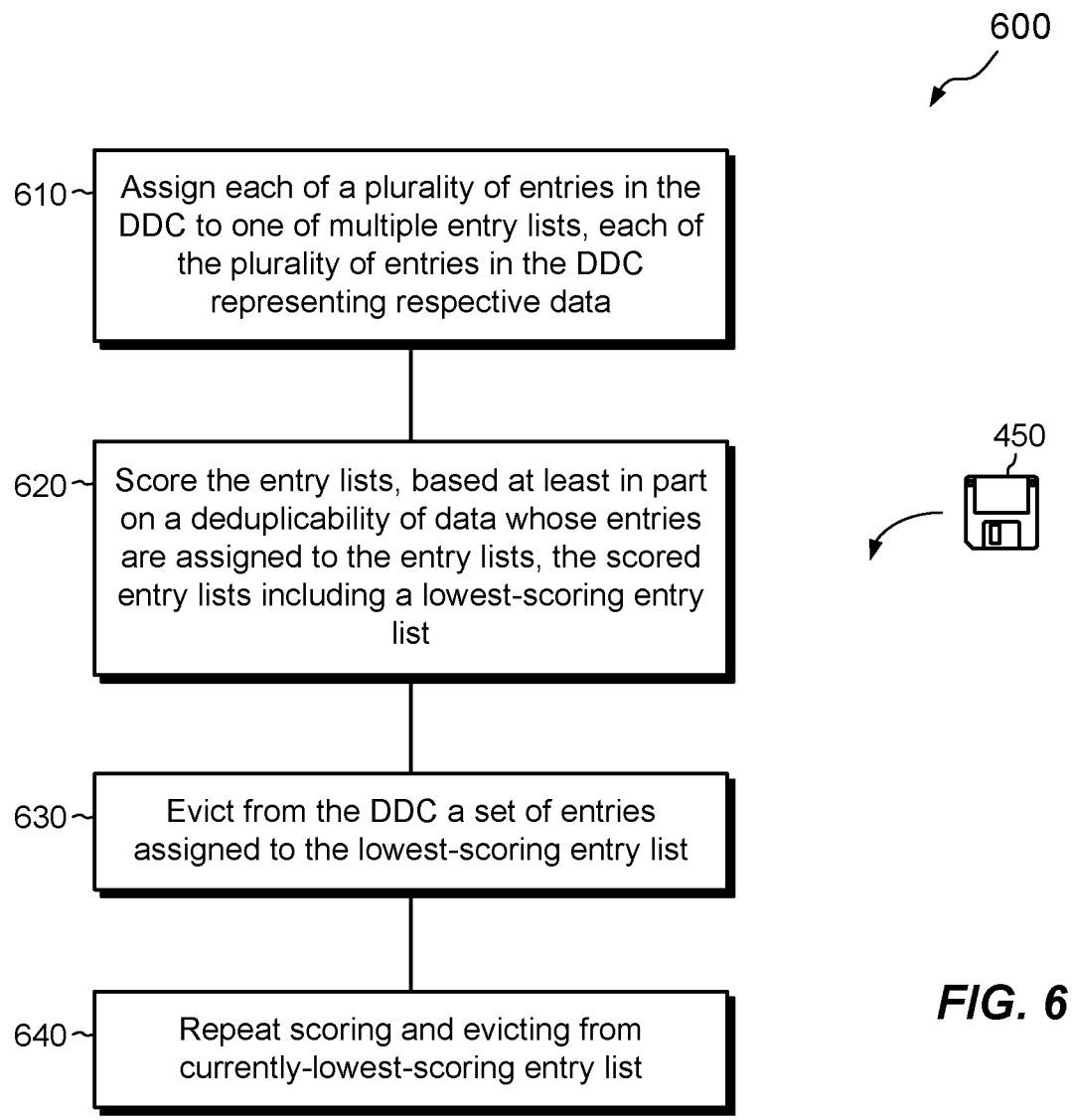

FIGS. 4-6 show example methods 400, 500, and 600 that may be carried out in connection with the environment 100. The methods 400, 500, and 600 are typically performed, for example, by the software constructs described in connection with FIG. 1, which reside in the memory 130 of the storage processor 120 and are run by the set of processors 124. The various acts of methods 400, 500, and 600 may be ordered in any suitable way. Accordingly, embodiments may be constructed in which acts are performed in orders different from those illustrated, which may include performing some acts simultaneously.

FIG. 4 shows example method 400 for assigning entries 142 in the DDC 140 to entry lists 150. At 410, a new block 134 is received, e.g., into data cache 132. In an example, the new block 134 is received in a write request 112W directed to a specified logical address of a specified data object 170. At 420, SP 120 creates a new entry 142n in the DDC 140 for the new block 134. The new entry 142n may be created after first generating a digest for new block 134 as a hash of its contents and then performing a lookup into the DDC 140 for a matching block. Here, no match was found, so new entry 142n was created. The new entry 142n may include the computed digest 142a and a location 142b of the block 134 in the data cache 132. At 430, SP 120 assigns the new entry 142n to one of the entry lists 150. For example, the assignment of the entry to the entry list is based on the group 160 to which the data object belongs, the data object being the one specified in the write request 112W. In the FIG. 2 arrangement, where two LRUs act as entry lists for each group, SP 120 may add the new entry 142n to the tail 220 of the first LRU of the assigned group.

FIG. 5 shows example method 500 for managing LRUs in the example arrangements of FIGS. 2 and 3. At 510, a DDC hit is encountered to an entry (e.g., 142n) in a current group 160, such as the Good group. SP 120 detects the cache hit and proceeds to identify the current group to which the data object belongs, where the data object is the object that the entry 142n was written to when first creating the entry 142n.

At 520, if the data object's group has changed, e.g., if it is no longer the Good group, the operation proceeds to 530, whereupon the SP 120 moves the entry 142n to the tail of an LRU in the new group, such as the Excellent group. If it was determined at 520 that the data object's group did not change, operation proceeds instead to 540, whereupon SP 120 determines the number of DDC hits that entry 142n has received, e.g., by checking counter metadata. If the number of hits is less than the predetermined number 542 (described above), then operation proceeds to 550, whereupon SP 120 moves the new entry 142n to the tail of the current LRU. However, if the number of hits is greater than or equal to the predetermined number 542, operation instead proceeds to 560, where SP 120 moves the new entry 142n to the tail 220 of the second LRU of the current group.

FIG. 6 shows example method 600 for managing a deduplication digest cache (DDC) 140 and provides a summary of some of the features described above.

At 610, SP 120 assigns each of a plurality of entries 142 in the DDC 140 to one of multiple entry lists 150. Each of the plurality of entries in the DDC 140 represents respective data, such as respective blocks 134 of data. In an example, each entry 142 includes a digest computed as a hash of the block's contents and location information for locating the block 134 in the data storage system 116.

At 620, SP 120 scores the entry lists 150, based at least in part on a deduplicability of data whose entries 142 are assigned to the entry lists 150. The scored entry lists 150 include a lowest-scoring entry list 152.

At 630, SP 120 evicts 144 from the DDC 140 a set of entries assigned to the lowest-scoring entry list 152. In some examples, eviction is exclusive to the lowest-scoring entry list 152, with no evictions being made from other entry lists 150.

At 640, the acts of scoring and evicting from currently lowest-scoring entry lists are repeated, generally with different entry lists becoming new targets of eviction. In addition, SP 120 may reevaluate and reclassify data objects 170, such that data objects themselves change groups over time.

Reinforcement Learning Considerations:

Further details of a reinforcement learning (RL) implementation as managed by RL controller 176 will now be described. This description is intended to be illustrative of an effective implementation but is not intended to be limiting.

When assigning data objects 170 to groups 160, a mean for a group 160 may be updated as follows:

$$D_{k,t+1} = \frac{D_{k,t} * N_k + L_t * r_t}{N_{k,t} + L_t}$$

where,
$D_{k,t}$ is the mean deduplication rate for group K at sample time t,
$N_k$ is the accumulative dedup count for group K,
$r_t$ is the deduplication rate for the data object at sample time t, and
$L_t$ is the deduplication count for the data object at sample time t.

A final mean value for a group 160 may be and exponentially weighted average of past values for that group:

$$\hat{D}_{k,t+1} = \alpha \hat{D}_{k,t} + (1-\alpha) D_{k,t}$$

Where α is a number between 0 and 1.

During each sample interval of time $t_s$, the following factors are sampled:

$L_{i,t}$—The number of dedup hits in LRU i at sample time t.

$Q_{i,t}$—The queue length of LRU i at sample time t.

$A_{i,t}$—The average cache entry age for LRU i at sample time t.

$D_{i,t}$—The average deduplication time for LRU i at sample time t.

$H_{i,t}$—The cache hit rate for LRU i at time t.

These feature values may be normalized to the same scale (1-100). The normalization is accomplished by averaging values across all the LRU queues. For example, LRU Dedup Hit Rate Normalization $$\overline{L}_{i,t} = \frac{L_{i,t}}{\sum_{i=1}^{N} L_{i,t}} * 100 \ (i = 1, \ldots, N_L)$$

LRU Queue Length Normalization $$\overline{Q}_{i,t} = \frac{Q_{i,t}}{\sum_{i=1}^{N} Q_{i,t}} * 100 \ (i = 1, \ldots, N_L)$$

Cache entry age Normalization $$\overline{A}_{i,t} = \frac{A_{i,t}}{\sum_{i=1}^{N} A_{i,t}} * 100 \ (i = 1, \ldots, N_L)$$

The feature values used for computing rewards are exponentially weighted averages of past samples. For example:

$$\hat{L}_{i,t+1} = \alpha \hat{L}_{i,t} + (1-\alpha)\overline{L}_{i,t}$$

$$\hat{Q}_{i,t+1} = \alpha \hat{Q}_{i,t} + (1-\alpha)\overline{Q}_{i,t}$$

$$\hat{A}_{i,t+1} = \alpha \hat{A}_{i,t} + (1-\alpha)\overline{A}_{i,t}$$

The reward for this reinforcement learning model may be defined as a weighted combination of DDC features, including LRU hit rate, LRU queue length, and LRU age.

1) The reward for each DDC cache feature:

Reward for LRU deduplication hit rate $$R_{i,t}^L = F_L(\hat{L}_{i,t})$$

Reward for LRU age $$R_{i,t}^A = F_A(\hat{A}_{i,t})$$

Reward for LRU queue length $$R_{i,t}^Q = F_Q(\hat{Q}_{i,t})$$

2) The reward for LRU i at sample time t is computed as a weighted sum as follows:

$$R_{i,t} = R_{i,t}^L * \omega_{i,t}^L + R_{i,t}^Q * \omega_{i,t}^Q + R_{i,t}^A * \omega_{i,t}^A$$

3) The average reward for LRU i at sample time t is an exponentially weighted average of past rewards:

$$\hat{R}_{i,t+1} = \alpha \hat{R}_{i,t} + (1-\alpha)R_{i,t},$$

where $\alpha < 1$.

4) The group and LRU level may be factored into the final reward value so that the LRU in higher level gets more reward.

5) The reward values for all LRU's are stored in a table and updated at each sample time.

DDC RL model parameters may be updated at each sample time based on newly collected feature samples. Example updates may be performed as follows:

6) Update weights for reward a) The reward for each LRU is computed using the current weights:

$$R_{i,t} = R_{i,t}^L * \omega_{i,t}^L + R_{i,t}^Q * \omega_{i,t}^Q + R_{i,t}^A * \omega_{i,t}^A$$

b) Compute the deltas for weight for LRU is $$d\omega_{i,t}^L = \hat{L}_{i,t}(H_{i,t} - R_{i,t})$$

$$d\omega_{i,t}^Q = \hat{Q}_{i,t}(H_{i,t} - R_{i,t})$$

$$d\omega_{i,t}^A = \hat{A}_{i,t}(H_{i,t} - R_{i,t})$$

where $H_{i,t}$—The cache hit rate for LRU i at time t c) Take exponentially weighted average of deltas:

$$d\hat{\omega}_{i,t+1}^L = \alpha * d\hat{\omega}_{i,t}^L + (1-\alpha) * d\omega_{i,t}^L$$

$$d\hat{\omega}_{i,t+1}^Q = \alpha * d\hat{\omega}_{i,t}^Q + (1-\alpha) * d\omega_{i,t}^Q$$

$$d\hat{\omega}_{i,t+1}^A = \alpha * d\hat{\omega}_{i,t}^A + (1-\alpha) * d\omega_{i,t}^A$$

d) Update weights through regression $$\omega_{i,t+1}^L = \omega_{i,t}^L - \delta d\hat{\omega}_{i,t+1}^L$$

$$\omega_{i,t+1}^Q = \omega_{i,t}^Q - \delta d\hat{\omega}_{i,t+1}^Q$$

$$\omega_{i,t+1}^A = \omega_{i,t}^A - \delta d\hat{\omega}_{i,t+1}^A$$

An improved technique has been disclosed for managing a deduplication digest cache (DDC) 140. The technique includes assigning each digest entry 142 of the DDC 140 to one of multiple entry lists 150, scoring the entry lists 150 based at least in part on the deduplicability of the data represented by the digest entries 142 in the entry lists 150, and selecting for eviction from the DDC 140 entries assigned to the lowest-scoring entry list 152. In this manner, entries 142 assigned to entry lists that perform more poorly in terms of deduplicability tend to be evicted more quickly than entries assigned to entry lists that perform better. The DDC 150 is thus more efficiently managed.

Having described certain embodiments, numerous alternative embodiments or variations can be made. For example, although embodiments have been described in relation to a data storage system 116, this is merely an example. Alternatively, some embodiments may be implemented using servers that may be distributed across locations, including in the cloud. Also, some embodiments may employ software-defined storage solutions, rather than conventional hardware arrays and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 450 in FIGS. 4-6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing a deduplication digest cache (DDC) in a computerized apparatus, the method comprising:
   assigning each of a plurality of entries in the DDC to one of multiple entry lists, each of the plurality of entries in the DDC representing respective data;
   scoring the entry lists, based at least in part on a deduplicability of data whose entries are assigned to the entry lists, the scored entry lists including a lowest-scoring entry list; and
   evicting from the DDC a set of entries assigned to the lowest-scoring entry list,
   wherein each of the entry lists belongs to one of multiple deduplicability groups, wherein the entries in the DDC represent blocks of data previously written to multiple data objects, and wherein the method further comprises assigning each of the data objects to a respective one of the deduplicability groups at least in part by (i) identifying the deduplicability group of the data object to which the respective block was written and (ii) adding the entry to an entry list that belongs to that deduplicability group.

2. The method of claim 1, wherein assigning data objects to deduplicability groups is based at least in part on deduplication levels of the data objects and is repeated over time, causing at least one of the data objects to change from one deduplicability group to another.

3. The method of claim 2, wherein the deduplicability groups include a high deduplicability group for relatively highly deduplicable data, a low deduplicability group for relatively poorly deduplicable data, and an unknown deduplicability group, and wherein the method further comprises assigning a new data object having no determined deduplicability level to the unknown deduplicability group.

4. The method of claim 2, further comprising forming at least some of the deduplicability groups by performing K-Means clustering based on deduplication levels of the data objects.

5. The method of claim 1, wherein scoring the entry lists is repeated over time to produce a current lowest-scoring entry list upon each repetition, and wherein the method further comprises evicting entries from the current lowest-scoring entry list.

6. The method of claim 5, wherein scoring the entry lists includes calculating a score for each of the entry lists based upon at least one of (i) a number of entries in the entry list, (ii) a number of deduplication hits in the DDC for entries in the entry list, (iii) an average age in the DDC of each entry in the entry list, (iv) an average time between deduplication hits for entries in the entry list, and (v) a deduplication hit rate of entries in the entry list.

7. The method of claim 1, further comprising providing two entry lists for each deduplicability group, the two entry lists implemented as a first LRU (Least Recently Used queue) and a second LRU, the first LRU of each group receiving entries that are newly added to the respective group, the second LRU of each group receiving popular entries from the first LRU of the same group, the popular entries being those that have received a predetermined number of DDC hits since being added to the first LRU of the same group.

8. The method of claim 7 wherein a particular entry is assigned to an LRU of a first deduplicability group, wherein the particular entry was created in the DDC for a data block written to a particular data object, and wherein the method further comprises:
   identifying a second deduplicability group to which the particular data object now belongs; and
   moving the particular entry to one of the LRUs of the second deduplicability group.

9. The method of claim 8, wherein the acts of identifying the second deduplicability group and moving the particular entry are performed in response to receiving a DDC hit on the particular entry.

10. The method of claim 7, wherein scoring the entry lists includes calculating scores for the LRUs in all of the deduplicability groups, each score for an LRU based upon at least one of (i) a number of entries in the LRU, (ii) a number of deduplication hits in the DDC for entries in the LRU, (iii) an average age in the DDC of each entry in the LRU, (iv) an average time between deduplication hits for entries in the LRU, and (v) a deduplication hit rate of entries in the respective LRU.

11. The method of claim 10, further comprising applying the scores for the LRUs as part of a reinforcement learning system whose goal is to maximize a long-term cache hit rate of the DDC.

12. The method of claim 1, wherein the lowest-scoring entry list is the entry list whose entries perform the most poorly in terms of deduplicability from among the scored entry lists.

13. A computerized apparatus, comprising control circuitry that includes a set of processing units coupled to memory, the control circuitry constructed and arranged to:
   assign each of a plurality of entries in a deduplication digest cache (DDC) to one of multiple entry lists, each of the plurality of entries in the DDC representing respective data;

score the entry lists, based at least in part on a deduplicability of data whose entries are assigned to the entry lists, the scored entry lists including a lowest-scoring entry list; and evict from the DDC a set of entries assigned to the lowest-scoring entry list;

wherein each of the entry lists belongs to one of multiple deduplicability groups, wherein the entries in the DDC represent blocks of data previously written to multiple data objects, and wherein the control circuitry is further constructed and arranged to assign each of the data objects to a respective one of the deduplicability groups at least in part by (i) identifying the deduplicability group of the data object to which the respective block was written and (ii) adding the entry to an entry list that belongs to that deduplicability group.

14. A computer program product including a set of non-transitory, computer-readable media having instructions which, when executed by control circuitry of a computerized apparatus, cause the computerized apparatus to perform a method of managing a deduplication digest cache (DDC), the method comprising:

assigning each of a plurality of entries in the DDC to one of multiple entry lists, each of the plurality of entries in the DDC representing respective data;

scoring the entry lists, based at least in part on a deduplicability of data whose entries are assigned to the entry lists, the scored entry lists including a lowest-scoring entry list; and evicting from the DDC a set of entries assigned to the lowest-scoring entry list;

wherein each of the entry lists belongs to one of multiple deduplicability groups, wherein the entries in the DOG represent blocks of data previously written to multiple data objects, and wherein the method further comprises (i) assigning each of the data objects to a respective one of the deduplicability groups and (ii) forming at least some of the deduplicability groups by performing K-Means clustering based on deduplication levels of the data objects.

15. The computer program product of claim 14, wherein assigning data objects to deduplicability groups is based at least in part on deduplication levels of the data objects and is repeated over time, causing at least one of the data objects to change from one deduplicability group to another.

16. The computer program product of claim 14, wherein scoring the entry lists is repeated over time to produce a current lowest-scoring entry list upon each repetition, and wherein the method further comprises evicting entries from the current lowest-scoring entry list.

17. The computer program product of claim 14, wherein the method further comprises providing two entry lists for each deduplicability group, the two entry lists implemented as a first LRU (Least Recently Used queue) and a second LRU, the first LRU of each group receiving entries that are newly added to the respective group, the second LRU of each group receiving popular entries from the first LRU of the same group, the popular entries being those that have received a predetermined number of DDC hits since being added to the first LRU of the same group.

18. The computer program product of claim 17, wherein scoring the entry lists includes calculating scores for the LRUs in all of the deduplicability groups, each score for an LRU based upon at least one of (i) a number of entries in the LRU, (ii) a number of deduplication hits in the DDC for entries in the LRU, (iii) an average age in the DDC of each entry in the LRU, (iv) an average time between deduplication hits for entries in the LRU, and (v) a deduplication hit rate of entries in the respective LRU.

* * * * *